Feb. 15, 1955 — H. W. ALDEN — 2,702,194

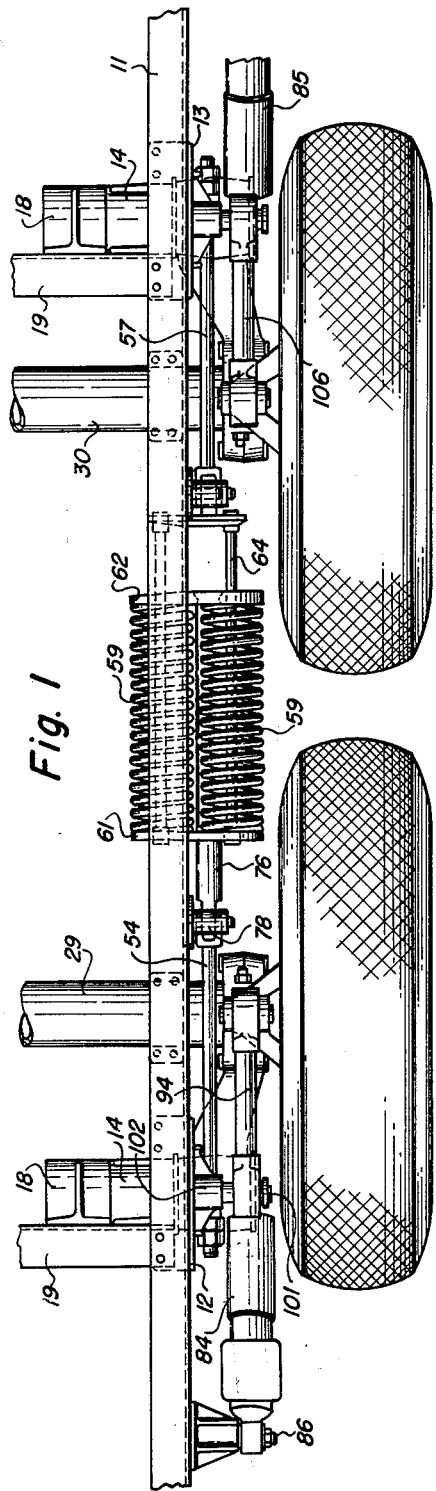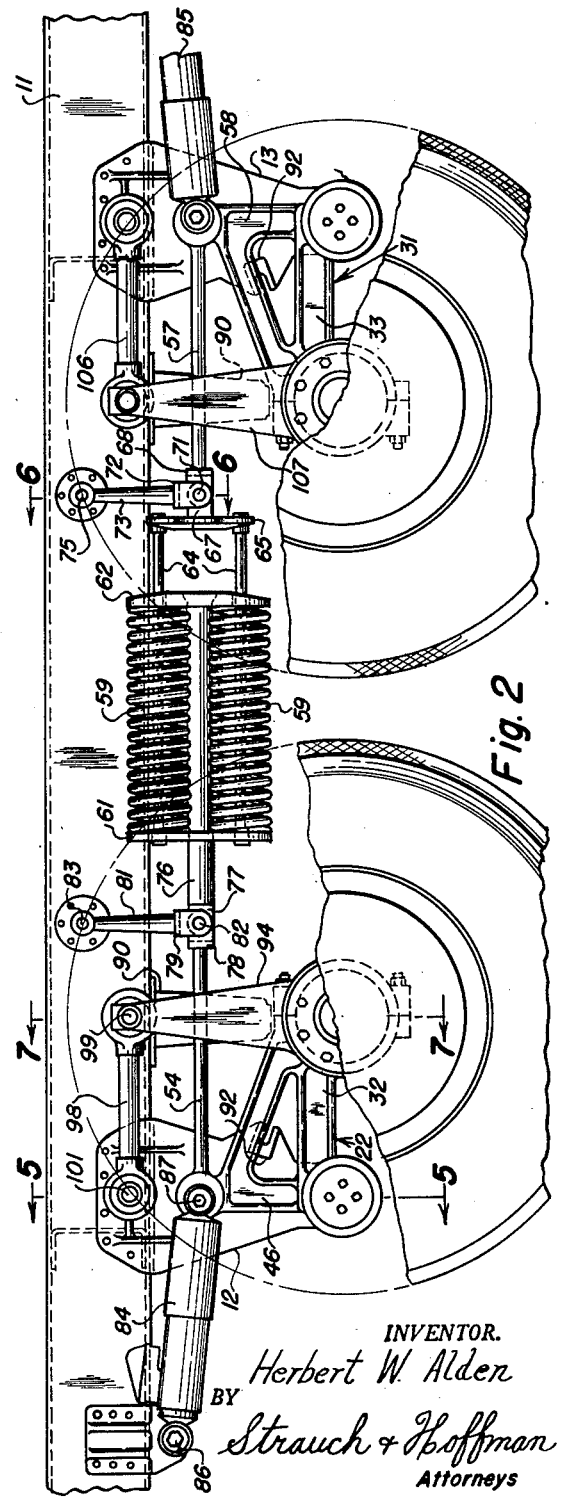

TANDEM AXLE SUSPENSION

Filed July 18, 1949 — 5 Sheets-Sheet 2

INVENTOR.
Herbert W. Alden
BY Strauch + Hoffman
Attorneys

Feb. 15, 1955 H. W. ALDEN 2,702,194
TANDEM AXLE SUSPENSION
Filed July 18, 1949 5 Sheets-Sheet 3

INVENTOR.
Herbert W. Alden
BY
Strauch & Hoffman
Attorneys

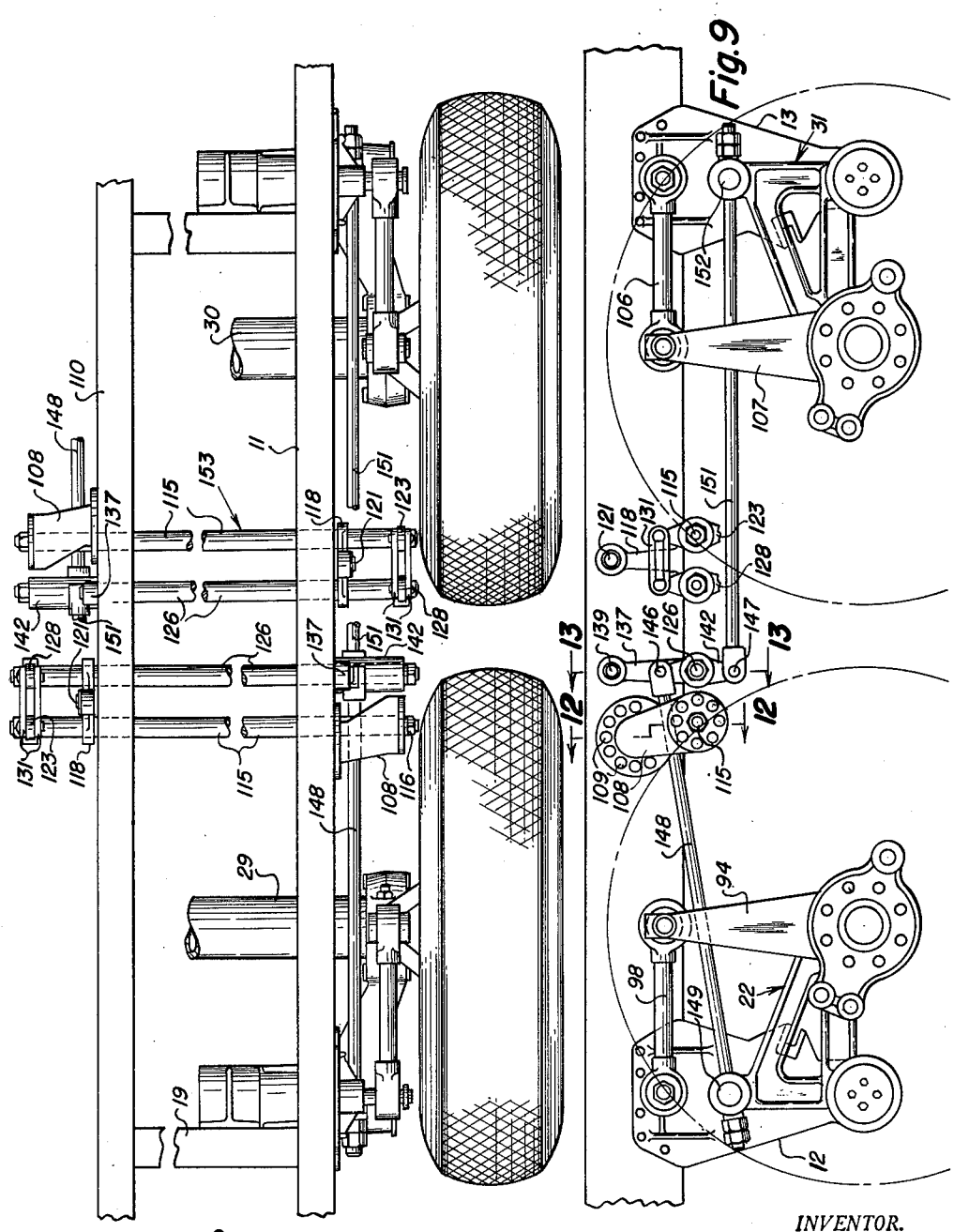

Feb. 15, 1955   H. W. ALDEN   2,702,194
TANDEM AXLE SUSPENSION
Filed July 18, 1949   5 Sheets-Sheet 5

INVENTOR.
Herbert W. Alden
BY Strauch & Hoffman
Attorneys

United States Patent Office 2,702,194
Patented Feb. 15, 1955

2,702,194

TANDEM AXLE SUSPENSION

Herbert W. Alden, Trenton, Mich., assignor, by mesne assignments, to Rockwell Spring and Axle Company, Coraopolis, Pa., a corporation of Pennsylvania Application July 18, 1949, Serial No. 105,289

6 Claims. (Cl. 280—104.5)

This invention relates to tandem axle vehicles and more specifically to spring suspensions for tandem axles.

The invention includes tandem axles mounted on bell cranks or other lever combinations pivoted on each side of the vehicle frame. A spring assembly interconnects the bell cranks on each side of the frame in such a manner that the vehicle load is always equally distributed between the axles regardless of their vertical movement with respect to each other. The axles are also torqued in a novel manner that requires but a single torque rod at each axle end. The term "bell crank" includes a multipiece as well as integral levers.

It is the major object of this invention to provide a shiftable spring suspension for tandem axles wherein a novel assembly of springs and connecting linkage with the axles results in equal distribution of the load on the axles regardless of their relative vertical positions.

Still another object of this invention is to provide a novel tandem axle assembly wherein a spring assembly connected between pivoted axle carrying members is mounted for longitudinal displacement to equalize the axle load during all operational conditions.

It is a further object of this invention to provide a vehicle having a pair of bell cranks pivoted on the frame in longitudinally spaced relation with an axle end carried by one arm of each bell crank and resilient means interconnecting the other arms of the bell cranks.

A further object of this invention is to provide in such a vehicle a novel axle torque resisting assembly including a rod connecting each axle end to the vehicle frame and disposed parallel to the axle carrying arm of the bell crank and of a length that is equal thereto.

Still another object of this invention is to provide a novel tandem axle suspension comprising bell cranks having axle carrying arms extending toward each other, and a spring assembly interconnecting the other arms of the bell crank.

Yet another object of this invention is to provide a tandem axle suspension wherein the axle ends are mounted resiliently in the bell crank arms and the bell cranks on opposite sides of the vehicle frame may pivot independently of each other.

Another object of this invention is to provide a novel tandem axle suspension comprising a longitudinal coil spring assembly interconnected by arms of bell cranks carrying the axles.

Another object of this invention is to provide a novel tandem axle assembly wherein axle carrying bell cranks are interconnected by a torsion spring assembly. Pursuant to this object the torsion spring assembly may comprise a plurality of torsion bars extending traversely of the frame with one bar anchored on the frame and the other connected to respond to movements of the bell cranks.

Still another object of this invention is to provide novel stop means to limit the vertical movement of axles in both directions.

These and other objects will become apparent as the specification proceeds in connection with the appended claims and the annexed drawings wherein:

Figure 1 is a top plan view of one side of a tandem axle suspension according to a preferred embodiment of the invention employing horizontal coil springs;

Figure 2 is a side elevation of the suspension of Figure 1;

Figure 8 is a top plan view of a one side of a tandem axle suspension according to a further embodiment of the invention employing transverse torsion rods;

Figure 9 is a side elevation of the suspension illustrated in Figure 8;

Figures 1–7 illustrate the tandem axle suspension of a preferred embodiment of the invention. Figures 1 and 2 illustrate the suspension at one side of the vehicle frame, usually at the rear, and it will be understood that the same suspension is provided between the ends of the axle and the frame at the other side of the vehicle.

Figure 3:
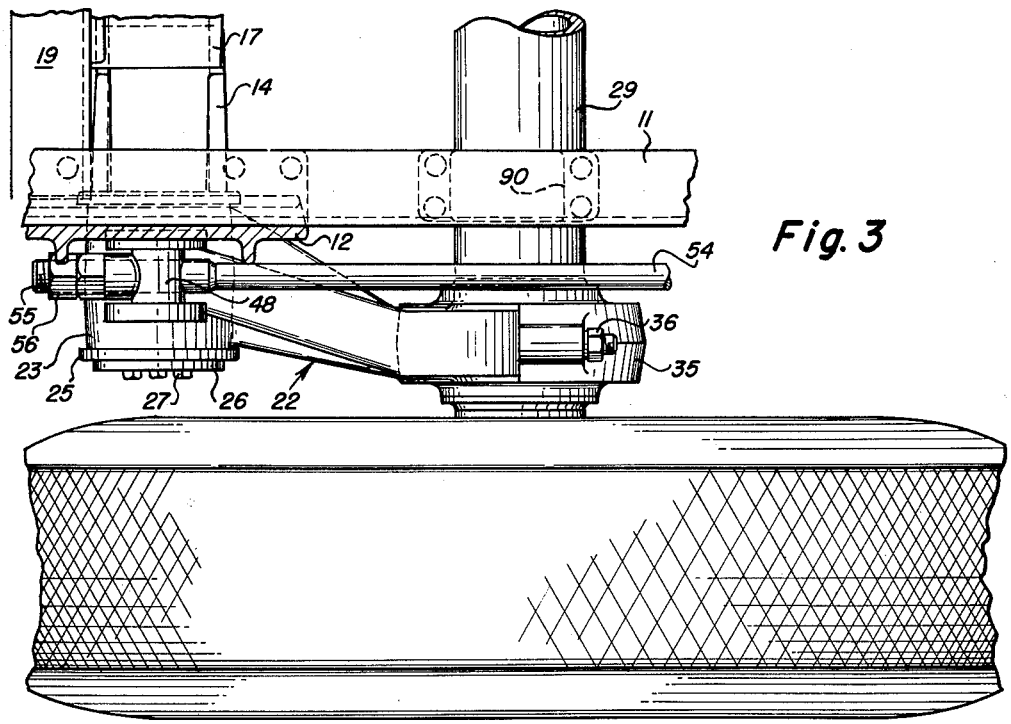
Figure 3 is an enlarged fragmentary plan view partly in section illustrating the bell crank and axle connections.

Longitudinal side member 11 of the vehicle frame has rigidly secured to it spaced depending brackets 12 and 13. Brackets 12 and 13 (see Figure 5) are each formed with integral hollow bosses 14 and 15 that project inwardly beneath the vehicle frame.

A cylindrical collar 16 having its outer end secured within upper boss 14 has its inner end secured within the split clamp boss 17 at the lower end of a reinforcing bracket 18 depending from transverse frame element 19 that is rigidly attached at opposite ends to the longitudinal side frame members 11. This construction provides reinforcement to prevent lateral bending of bracket 12 with respect to the vehicle frame. The same reinforcement is provided for bracket 13.

Lower boss 15 (Figure 5) has non-rotatably secured therein, as by a press fit, a cylindrical collar 21 that projects outwardly of the vehicle frame to serve as a bearing pivot for a sturdy bell crank lever 22 having an integral boss 23 journaled through bushings 24 on collar 21. Suitable grease seals 25 are provided at opposite ends of the boss 23, and a cap 26, secured by studs 27 threaded into an end block 28 welded across collar 21, prevents axial displacement of the bell crank on its pivot.

Wheel supported tandem axles 29 and 30, which may be drive or trailer axles, are parallel transversely of the vehicle. These axles 29 and 30 are spaced longitudinally of the vehicle a distance less than brackets 12 and 13 and are attached respectively to bell crank 22 and a similar bell crank 31 journaled on rear bracket 13. Bell cranks 22 and 31 have longitudinally projecting arms 32 and 33 respectively that extend toward each other from the respective bell crank pivots, so that each bell crank rotates oppositely in response to similar relative up or down movements between the axle and frame, for a purpose to appear.

Figure 4:
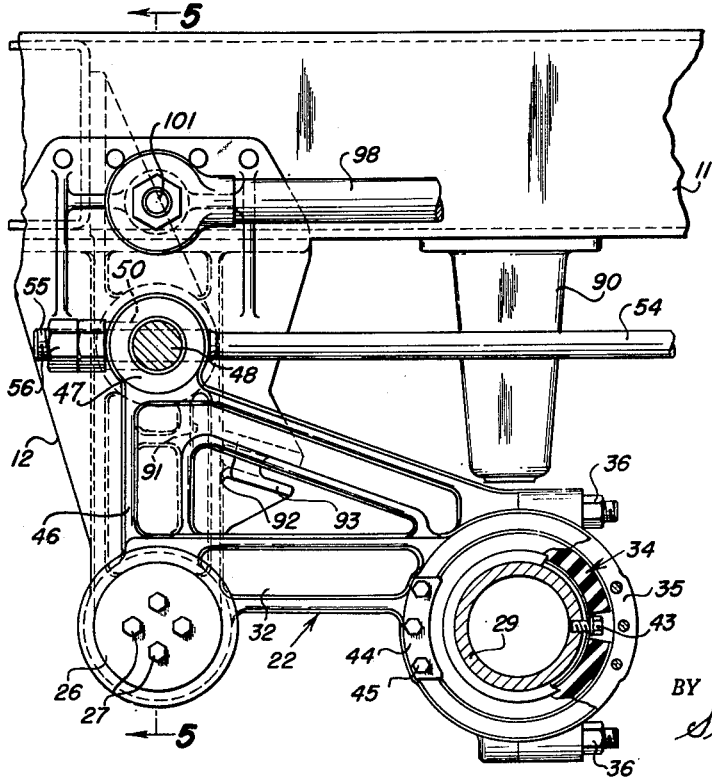
Figure 4 is a side elevation of the bell crank and axle connections of Figure 3.

As illustrated best in Figure 4, the rear end of bell crank 22 is formed with a cylindrical recess to receive a resilient sleeve assembly 34 that surrounds axle 29, and a cap 35 having a similar cylindrical recess fits over the resilient sleeve assembly and is secured to bell crank 22 as by studs 36. The resilient sleeve assembly comprises an annular body of resilient rubber 37, having thin metal shells 38 and 39 vulcanized to its inner and outer periphery. The assembly is mounted on axle 29 (Figure 7) with inner shell 38 disposed within the annular channel 41 formed on the periphery of a collar 42 welded upon axle 29, so that axial displacement of the resilient sleeve assembly along the axle is prevented. The inner shell 38 of the resilient sleeve assembly is secured upon axle 29 as by bolts 43 threaded into the axle, and outer shell 39 is frictionally tightly clamped between bell crank 22 and cap 35. Opposite side plates 44, secured to the bell crank and the cap 35 by bolts 45, restrain axial movement of the outer shell 39 relative to the bell crank.

The resilient sleeve assembly 34 therefore yieldably resists relative rotation between axle 29 and the attached end of bell crank 22, while permitting such relative rotation therebetween as is necessary during relative movements between the axle and frame. The assembly also cushions shock between the axle and frame.

Bell crank 22 is provided with an upwardly extending arm 46 at right angles to arm 22 that is bifurcated at its upper end at 47 (Figure 5) for the straddle mounting of a pin 48 which is rotatable in bearings 49. A snap ring 51 on pin 48 and a collar 52 on pin 48 prevent axial displacement of the pin relative to bell crank 22.

Within the bifurcated arm end 47, pin 48 is formed with a transverse bore 53 through which extends (Figure 4) one end of a rod 54 having a threaded terminal 55. A series of nuts 56, the innermost of which is formed to seat on a spacer 50 that contacts the surface of pin 48, are mounted on the threaded rod portion 47. A similar rod 57 has its rear end similarly secured within a pivot pin journaled, in the upper end of the arm 58 that projects upwardly at right angles to arm 33 of bell crank 31. Rods 54 and 57 extend toward each other.

Figure 6:
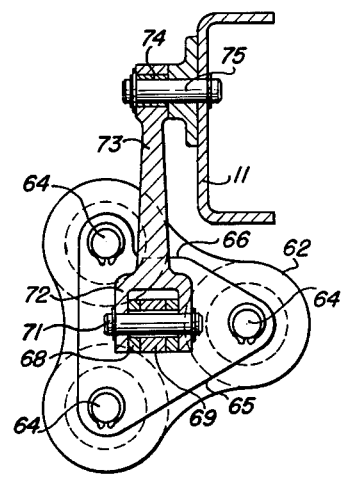
Figure 6 is a fragmentary rear elevation mainly in section along line 6—6 of Figure 2, illustrating the compression spring mountings.
Figure 14:
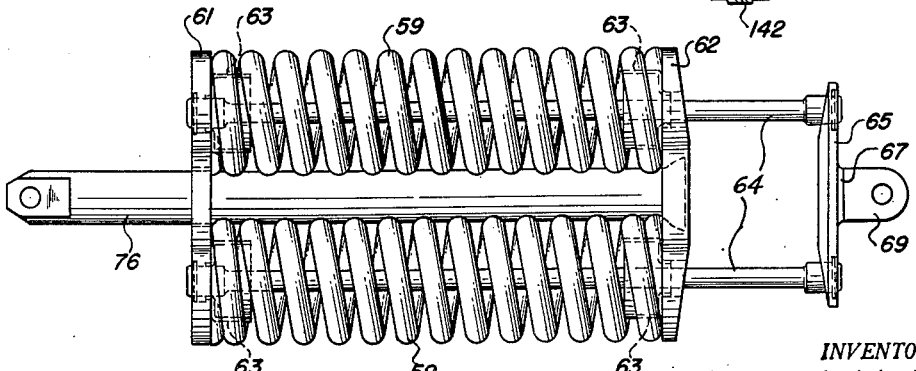
Figure 14 is an enlarged side elevation of the horizontal coil spring assembly of Figures 1–7.

A resilient assembly comprising a nest of three heavy similar coil springs 59 extends longitudinally of the vehicle at each side. This spring nest comprises two spaced end plates 61 and 62 which carry spring centering and guide retainer cups indicated at 63 in Figure 14. Three springs 59 of the same size and length have their opposite ends seated on cups 63 and the axes of the springs are equally spaced circumferentially as illustrated in Figure 6. Three rods 64, each centered within a spring 59 and having its forward end fixed to end plate 61, project freely slidably through end plate 62 and are affixed to a plate 65 illustrated in Figure 6 as having a notched peripheral portion 66.

Projecting rearwardly from end plate 62 is a boss 67 that is centered with respect to the longitudinal axis of the spring assembly. Rod 57 which projects forwardly from rear bell crank 31 has a bifurcated end 68 that embraces the flattened end 69 of boss 67 to which it is relatively pivotally connected by a pin 71. Outwardly of rod end 68, pin 71 is also pivotally connected to the bifurcated lower end 72 (Figure 6) of a depending link 73 whose upper end is freely journaled in a bushing 74 on a fixed pivot pin 75 projecting laterally from side frame member 11.

A rod 76 having its rear end fixed to end plate 62 projects forwardly from end plate 62 through the spring assembly along its longitudinal centerline and slidably through end plate 61 and is formed with a flattened front end 77 that is embraced by the bifurcated rear end 78 of rod 54 that in turn is embraced by the bifurcated lower end 79 of depending link 81, the rods 54 and 76 and link 81 being freely pivotally connected by pin 82. The upper end of link 81 is freely journaled on fixed pivot pin 83, and link 81 is of the same length as link 73 so that the spring assembly is suspended from the frame.

Thus axles 29 and 30 are pivotally connected to the vehicle frame by corresponding arms of bell cranks 22 and 31 respectively, and the other arms of the bell cranks are interconnected by the above described horizontal coil spring assembly so that similar upward movements of both axles is resisted by compression of the spring assembly. However should one axle be raised or lowered relative to the other during operation the entire suspension will simply swing forwardly or rearwardly like a horizontal beam on its end pivots which are the pivot axes of the bell cranks until the load is equally supported by both axles before the spring assembly is compressed by the load.

Forwardly and rearwardly of the suspension at each side, shock absorbers 84 and 85 of the strut type are connected between the bell cranks and the frame, the purpose of these shock absorbers being to control longitudinal swinging of the spring suspension by slowing the speed of swinging of the suspension as in rough country where the axles are rapidly relatively raised and lowered, and thereby reduce the forces exerted on the various linkages of the suspension.

Figure 5:
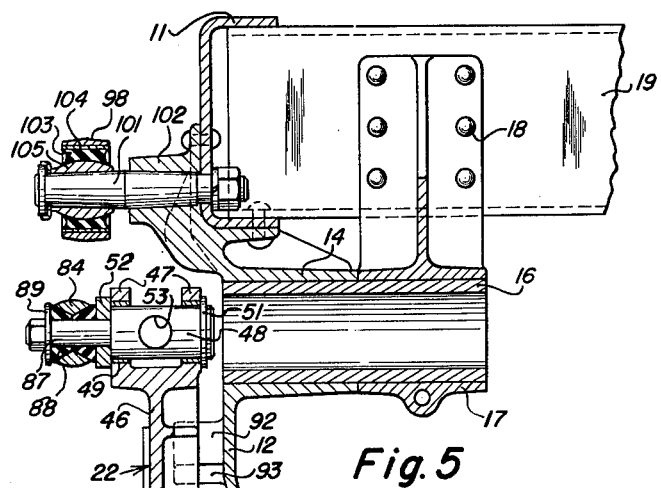
Figure 5 is a section along line 5—5 of Figures 2 and 4 illustrating further details of the connections.

Referring to Figures 1, 2 and 5, the front end of shock absorber 84 is pivoted to a frame bracket at 86 and the rear end of shock absorber 84 is pivoted to bell crank 22 at 87 which is preferably a rigid axial extension of pin 48. Each shock absorber end is connected to its pivot as illustrated in Figure 5 wherein the rubber washers 88 compressed between the shock absorbers and the pivot pin provide a substantially universal resilient mounting for the shock absorber ends, washer 89 serving as an axial retainer. Shock absorber 85 is similarly connected between bell crank 31 and the vehicle frame.

Adjacent each axle end each side frame member is provided with a depending bumper 90 that limits the relative movement of the axles and frame toward each other.

Bell crank 22 is integrally formed with a vertical rib 91 that may abut against a stop face 92 on an integral projection 93 on bracket 12, to limit relative separational movement of the axle 29 and the frame, and a similar arrangement is provided at each bell crank connection.

Each axle end is also connected to the vehicle frame by a special torque rod assembly that prevents rotation of the axle housings due to brake and drive torque reactions. This comprises an arm 94 having its lower end secured rigidly to axle 29, as by having a hollow boss formed with an internal flange 95 secured by bolts 96 to a flange 97 on the axle (Figure 7).

The upper end of vertical arm 94 is bifurcated to receive the end of a generally horizontal torque rod 98 that extends between a fixed pin 99 on arm 94 and a fixed pin 101 secured to side frame member 11. As illustrated in Figure 5, pin 101 derives lateral support from a boss 102 on bracket 12 in which it is press fitted and through which it projects. The ends of rod 98 are attached to pins 99 and 101 through resilient universal connections wherein an annular body of rubber 103 has its outer periphery vulcanized to a cylindrical shell 104 clamped tightly to rod 98 and its inner periphery vulcanized to an ellipsoidal part 105 rigid with the pin. A similar torque rod 106 and axle mounted arm 107 assembly is connected between each end of axle 30 and the frame.

As illustrated in Figure 2, rods 98 and 106 are equal in length and parallel to the longitudinal axle carrying arms 32 and 33 respectively of the bell cranks.

Figure 7:
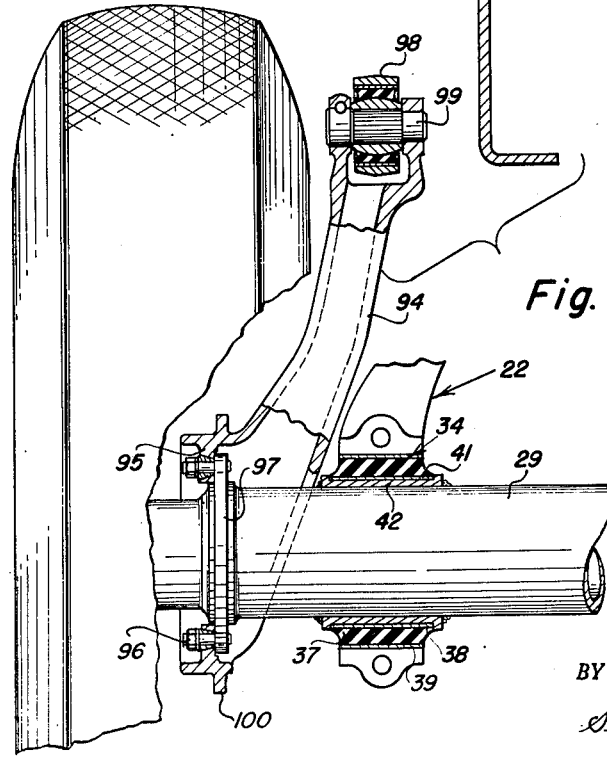
Figure 7 is a fragmentary rear elevation mainly in section along line 7—7 of Figure 2, illustrating the manner in which the torque rod is connected to the axle.

As illustrated in Figure 7, the boss on the lower end of arm 94 may be formed with an integral radial flange 100 for attachment of the usual brake mechanism supporting spider. In this way the invention may be adapted to standard axles wherein the flange 97 is the usual brake spider attachment flange.

Figure 1 illustrates the position of the parts of the suspension under normal load with the vehicle on a level surface. It will be observed that rods 54 and 57 are substantially horizontal and aligned with the central axis of the compressed horizontal coil spring assembly, the latter being effectively swingingly supported by equal length levers 73 and 81. The torque rods 98 and 106 are also substantially horizontal and in alignment with each other.

During operation when relative vertical movement with respect to the frame takes place between axles 29 and 30, as when one axle passes over a bump on the road, the bell cranks 22 and 31 undergo similar relative rocking movement which does not transfer the load from axle to axle but which longitudinally repositions the entire spring suspension assembly which swings longitudinally on levers 73 and 81 to seek a position where the load on both axles is equal, the compression of springs 59 remaining substantially unchanged. This swinging of the suspension is dampened and stabilized by the shock absorbers 84 and 85 which are slightly and oppositely tilted with respect to the horizontal and prevent abrupt changes in the action.

When both axles 29 and 30 rise together with respect to the frame, the bell cranks 22 and 31 are oppositely rocked to further compress the springs 59, an action which is analagous to further loading of the vehicle. Should both axles 29 and 30 drop together with respect to the frame the bell cranks 22 and 31 oppositely rotate to lessen the compression of the springs. This is an advantageous circumstance for servicing the suspension as when it is desired to replace the coil springs 59.

Figures 8–13 illustrate a further embodiment of the invention wherein torsion springs are employed in the suspension. The frame support brackets, bell cranks and torque assemblies are substantially the same as in Figures 1–7.

Figure 10:
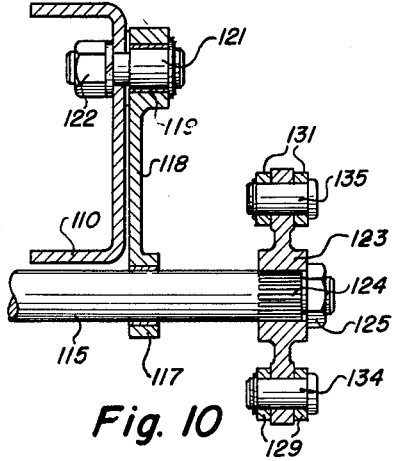
Figure 10 is a section along line 10—10 of Figure 11 illustrating the torsion rod end connections and support on the frame.
Figure 11:
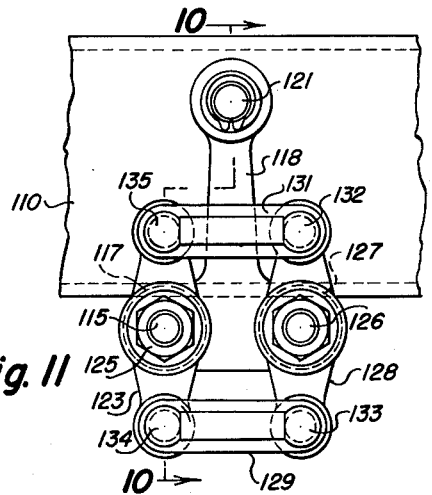
Figure 11 is a side elevation of the torsion rod end connections of Figure 10.
Figure 12:
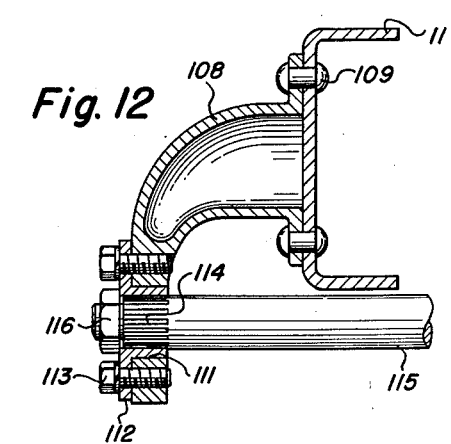
Figure 12 is a fragmentary section through the stationary frame support along line 12—12 of Figure 9.
Figure 13:
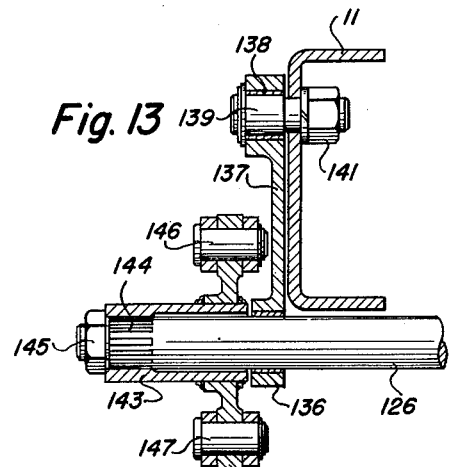
Figure 13 is a fragmentary section through the torsion bar end mounting along line 13—13 of Figure 19.

A rigid downwardly extending support member 108, secured as by rivets 109 to the vehicle side frame member 11, is provided with an aperture 111 below the frame level as illustrated in Figure 12. A flanged collar 112 is secured within apertures 111 as by screws 113 and its internally taper-splined bore receives the splined end 114 of solid steel torsion bar 115. Nut 116 threaded on the end of bar 115 holds it securely against axial movement with respect to support member 108. Thus one end of torsion bar 115 is anchored non-rotatably upon the vehicle frame. Torsion bar 115 extends horizontally transversely across the entire vehicle frame and is journalled in offset boss 117 of a link 118 which, as illustrated in Figures 10 and 11, is pivotally mounted through a bushing 119 on a pin 121 securely clamped to the other side frame member 110 by nut 122.

A lever 123 is fixed intermediate its ends on the taper-splined end 124 of torsion bar 115 and held against axial movement with respect to it as by nut 125. A second torsion bar 126 has an end journalled in a second and oppositely offset boss 127 of link 118. A lever 128 similar to lever 123 is secured to the taper-splined end of torsion bar 126 in the same manner that lever 123 is secured to bar 115. Levers 123 and 128 are pivotally interconnected above and below the torsion bars by straps 129 and 131 that are of equal length, the pivots 132–135 being equidistant from the plane containing the torsion bar axes so that a flexible parallelogram connection is thereby provided. The torsion bar axes are also equidistant from the vertical plane containing the pivot of link 118.

Torsion bar 126 extends horizontally transversely back across the vehicle frame and is journalled in a boss 136 of a depending link 137 that is journalled through bushing 138 on a pin 139 securely clamped to frame side member 11 as by nut 141. A lever 142 having an elongated hub 143 is non-rotatably secured intermediate its ends to the taper-splined end 144 of torsion bar 126 and is held against axial movement as by nut 145. Lever 142 is provided above and below the axis of bar 126 with equally spaced pivot pins 146 and 147.

Referring now to Figures 8 and 9, a longitudinal rod 148 has its bifurcated rear end pivotally connected to upper pivot pin 146, and its forward end is rigidly connected to a pivot member 149 that is similar to pivot pin 48 of Figures 1–7 and similarly mounted on bell crank 22. A second longitudinal rod 151 has its bifurcated front end pivoted on lower pivot pin 147, and its rear end is fixed to a rotatable pivot pin 152 like pivot pin 48 and similarly mounted on bell crank 31.

In the illustrated arrangement, it will be appreciated that the torsion bar assembly provides a torsion bar spring having a length equal to the combined lengths of parallel bars 115 and 126. It is within the province of the invention to provide a shorter torsion bar, or a differently arranged and supported torsion bar assembly, or to replace the solid steel torsion bars with metal sleeve and rubber annulus torsion springs that are of well known construction. The essential point is that the torsion spring assembly is effectively swingingly mounted on links 137 and 118, which are of equal length. The fact that the end of torsion bar 115 is anchored to the frame does not interfere with this swinging movement of the spring assembly, as such results only in a slight non-parallel relation of the torsion bars without stressing either more appreciably.

As illustrated in Figures 8 and 9, a second and similar torsion rod assembly 153 for the suspension at the other side of the frame, reversely arranged with respect to that above-described is mounted beneath the vehicle frame. Similar numerals are used in assembly 153 which is parallel to the other torsion rod assembly but not connected to it except through the frame.

In operation, when both axles move upwardly together toward the frame, the bell cranks are oppositely rocked whereby lever 142 is rocked counterclockwise in Figure 9 and bars 126 and 115 are placed under increased torsion according to the load.

When the axles move relatively vertically, the entire torsion spring assembly shifts longitudinally, swinging on links 118 and 137 until each axle is equally loaded. There is no shift of load from one axle to the other. Preferably the shock absorbers of Figures 1–7 may be used in this embodiment, but they are not shown in the drawing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and desired to be secured by United States Letters Patent is:

1. In a tandem axle assembly, a frame, spaced axles, bell cranks pivoted on the frame and having axle connected arms extending toward each other from the bell crank pivots to the respective axles, a separate spring assembly for each side of the tandem axle assembly, rigid members interconnecting each bell crank with its associated spring assembly, and means pivotally suspending each said spring assembly from the frame independently of said bell cranks comprising links pivoted on the frame and pivotally connected to opposite ends of the spring assembly.

2. In a tandem axle assembly, a frame, spaced axles, a pair of bell cranks pivoted on each side of the frame and having axle connected arms projecting toward each other, a spring assembly for each side of the tandem axle assembly located intermediate the axles, rods pivotally interconnecting each bell crank with its associated spring assembly, means pivotally suspending each said spring assembly from the frame, an arm rigidly upstanding from each axle end, and longitudinally extending torque rods pivoted at opposite ends to said arms and said frame, said torque rods being each of substantially the same length and parallel to the axle connected arms of the associated bell cranks.

3. In a tandem axle assembly for a multi-wheel vehicle, a frame, a pair of laterally extending longitudinally spaced axles disposed beneath said frame and supported at their ends by ground engaging wheels, means for supporting said frame upon said axles comprising a parallelogram linkage at each side of said frame for each of said axles, each of said linkages being formed of a pair of rigid spaced parallel side links and a pair of rigid spaced parallel interconnecting links pivotally connected to said side links, one of said side links being rigidly fixed to the frame in a position substantially normal thereto and the other of said side links being rigidly fixed to the associated one of said axles, a pair of spring assemblies mounted on said frame intermediate said axles for bodily movement relative thereto, a lever fixed to one of the interconnecting links of each of said linkages, motion transmitting mechanism connecting the levers of the ones of said linkages on one side of said frame to one of said spring assemblies, and a motion transmitting mechanism structurally independent of the first said mechanism pivotally interconnecting the other of said spring assemblies with the levers of the ones of said linkages on the other side of said frame whereby the load carried by the wheels on one side of said frame is equalized independently of the load equalization on the wheels on the other side of said frame.

4. In a tandem axle assembly for a multi-wheel vehicle, a frame, a pair of laterally extending longitudinally spaced axles disposed beneath said frame and supported at their ends by ground engaging wheels, means for supporting said frame upon said axles comprising a parallelogram linkage at each side of said frame for each of said axles, each of said linkages being formed of a pair of rigid spaced parallel side links and a pair of rigid spaced parallel interconnecting links pivotally connected to said side links, one of said side links being rigidly fixed to the frame and the other of said side links being rigidly fixed to the associated one of said axles, a pair of spring assemblies mounted on said frame intermediate said axles, and motion transmitting mechanism operatively connecting one of the interconnecting links of the ones of said linkage on the same side of said frame to a common one of said spring assemblies whereby the load carried by the wheels on one side of said frame will be equalized independently of the load equalization on the wheels on the other side of said frame.

5. In a tandem axle vehicle suspension, a frame, spaced axles, separate spring assemblies for the opposite sides of the frame each pivotally connected to the frame for bodily movement longitudinally of the frame, two bell cranks at each side of the frame pivoted upon transverse axes on longitudinally spaced portions of the frame, each said spring assembly being supported on the frame independently of said bell cranks, and the bell cranks on each side having longitudinal arms extending toward each other and connected to one of said axles and upwardly extending arms connected by motion transmitting means to the spring assembly for that side of the frame, an arm rigid with each axle end, and a torque rod operatively interconnecting each said rigid arm and the frame.

6. In a tandem axle vehicle suspension, a frame, spaced axles, a pair of bell cranks pivoted on each side of the frame and having axle connected arms projecting toward each other from the bell crank pivots to the respective axles, a spring assembly on each side of the axle assembly located intermediate the axles, rods pivotally interconnecting each bell crank with the associated spring assembly, and means separate from said bell cranks independently pivotally suspending each spring assembly on said frame.

References Cited in the file of this patent

UNITED STATES PATENTS

| | | |
|---|---|---|
| 480,274 | O'Dell | Aug. 9, 1892 |
| 1,129,744 | Shearer | Feb. 23, 1915 |
| 1,427,240 | Stanfield | Aug. 29, 1922 |
| 1,861,866 | Knox et al. | June 7, 1932 |
| 1,894,776 | Liang | Jan. 17, 1933 |
| 1,930,208 | Marcum | Oct. 10, 1933 |
| 2,099,819 | Mercier | Nov. 23, 1937 |
| 2,233,145 | Schimek | Feb. 25, 1941 |

FOREIGN PATENTS

| | | |
|---|---|---|
| 608,558 | France | Apr. 24, 1926 |